(12) United States Patent
Cooper

(10) Patent No.: US 6,351,281 B1
(45) Date of Patent: *Feb. 26, 2002

(54) DELAY TRACKER

(76) Inventor: James Carl Cooper, 15288 Via Pinto, Monte Sereno, CA (US) 95030

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/119,524

(22) Filed: Jul. 21, 1998

Related U.S. Application Data (62) Division of application No. 08/620,126, filed on Mar. 21, 1996.
(60) Provisional application No. 60/008,309, filed on Dec. 7, 1995.

(51) Int. Cl.[7] .................................. H04N 17/00
(52) U.S. Cl. .................. 348/192; 324/617; 324/621
(58) Field of Search .......................... 348/181, 182, 348/183, 180, 189, 192, 193, 614; 324/621, 617, 620, 612; H04N 17/00, 17/02

(56) References Cited

U.S. PATENT DOCUMENTS

| | | | | |
|---|---|---|---|---|
| 5,233,418 A | * | 8/1993 | Gumm et al. | 348/181 |
| 5,237,416 A | * | 8/1993 | Ito et al. | 348/614 |
| 5,397,992 A | * | 3/1995 | Hill | 324/617 |
| 5,399,976 A | * | 3/1995 | Wardle | 324/627 |
| 5,672,974 A | * | 9/1997 | Turner | 324/617 |

* cited by examiner

Primary Examiner—Michael Lee
(74) Attorney, Agent, or Firm—Lightbody Law Office (57) ABSTRACT

A delay tracker utilizes a special code on the tracked signal in order to recognize such signal and ascertain any delays associated therewith.

13 Claims, 4 Drawing Sheets

DELAY TRACKER

This is a divisional of copending application Ser. No. 08/620,126 filed on Mar. 21, 1996.

FIELD OF THE INVENTION

This invention relates to a method and apparatus for accurately ascertaining the processing delay of a signal. It is particularly useful for synchronizing a multiplicity of signals, some of which may have passed through processing (including transmission systems) having delays, in order to resynchronize the signals at a known point in time. This application claims priority to the provisional Application 60/008,309 filed Dec. 7, 1995—Multiple Video Input Delay Measurement System, J. Carl Cooper inventor.

BACKGROUND OF THE INVENTION

A problem exists in many systems when the various primary and related signals are processed (including by transmission and by storage, either direct or indirect, within a facility and/or to/from a facility). Examples include video systems wherein there are many video and/or audio signal sources from television cameras, tape recorders, direct feeds, remote feeds from microwave and satellite, not to mention what might occur to the signal—noise reduction, synchronizers, transcoders, switching facilities, obscenity drop circuits, etc.

The invention is specifically usable in respect to television signals and will be described with such signals for a preferred embodiment. For example, a problem exists in many television facilities when the various video and audio signals are processed within the station (or from facility to facility for that matter). There are also many video signal sources; from television cameras, video tape recorders, remote feeds from microwave and satellite, together with signal manipulations such as noise reduction, etc. There are also many audio signal sources; from microphones, tape recorders, remote feeds, etc. subject to their own similar processing.

Television facilities utilize routing switchers in order that the video and audio from any source may be connected to the input of any video or audio device respectively, with the outputs of those devices also being connected to the router so that the video and audio can be connected to the input of any other instrument. The video and audio may, and frequently do, take entirely different paths having entirely different delays. These paths can include many forms of active and/or passive delays.

It is not uncommon to have a 64 by 64 matrix for each of the auxiliary and video signals. The output signal is frequently changed in delay by selection of different signal processing paths and selection of different ones of the input signals to be output. These router systems give literally hundreds of possibilities for signal path combinations, with the paths being frequently changed to facilitate operational needs, differing network feeds, local feeds, differing active processing circuits, et al.

Frequently, the video processing path involves several devices which can have one or more frames of delay. Many of these devices will have a changing delay as the mode of operation is changed by the operator, as the phase of the incoming video signal drifts with respect to the other video signals or to the systems reference, or otherwise. Examples include noise reduction systems, synchronizers, transcoders, drop out compensators et al.

It is not unusual for the video to suffer delays ranging from near zero to 10 frames of delay or more—i.e. 0.32 seconds before the signal exits the system.

The audio and secondary signals on the other hand usually are passed through devices which have relatively little delay compared to the video (although delays may be present due to processing similar to the video outline above). Frequently there are several audio channels, for example 2 channels of English, 2 channels of another language, a data channel and a control channel. However, when the video signal and the auxiliary signals experience relative timing variations due to the changing delays of the different paths, problems occur, the most commonly noticed one being lip sync error when the video is delayed with respect to the audio.

Variable delay devices exist for delaying signals and it is possible at any point in the system to delay the earlier arriving (typically audio) signal(s) to match the later arriving (typically video) signal. However, the problem in making such corrections arises in detecting the delay of the later (typically video) signal which is output from the system. This problem is compounded because the relative delay is constantly changing: the delay is often instantly changed as a signal is routed through different processing devices, and different ones of the many input signals are selected to be passed to the output.

The U.S. Pat. No. 5,202,761, Audio Synchronization Apparatus, is an attempt to solve some of these related problems. In this '761 patent, a pulse was added only in response to the video signal and then only in the vertical interval. It therefore would wait until the next vertical interval to add a pulse in the vertical interval. This would function within a certain given accuracy. Since all of the video inputs may be totally asynchronous some video signals might have their vertical interval pulse added immediately. However, others might have to wait nearly a whole frame to have their pulse added. This gives rise to an inherent one frame inaccuracy. Further, various devices exist which over write or remove the vertical interval, severely compromising the '761's performance.

These problems are not true in the present invention. In this invention, the delay of the signals which pass through the systems are measured through the use of a delay tracker which is associated with the signal. This delay tracker is carried with the signal through the system so that, when the selected one of the possibly many input signals is output from the system, the presence of the delay tracker can be detected for that (those) signal(s) by themselves or in combination with other signals. In a preferred embodiment, a delay measurement circuit means receives the delay tracker (directly or indirectly as later set forth) and starts counting time. When the delay tracker is detected on the signal out of the system, a delay tracker detected signal is sent to the delay measurement circuit which then stops the time count. The time at the stop is thereby a measure of the delay of the signal through the system. This measure of delay can then subsequently used, for example to adjust the synchronization of the various signals or otherwise.

Theory of Operation of the Delay Tracker System

In order to measure the delay of the signal which passes through the system, a delay tracker is present associated with the signal at a known point of processing. This might be at any point in the processing of such signal. The delay tracker is carried with the signal through the system, so that when the selected one of the many input signals is output from the system, the presence of the delay tracker can be detected and recovered for some use.

OBJECTS AND SUMMARY OF THE INVENTION

It is an object of this present invention to provide an improved apparatus and method for detecting and compensating for the delays present in processing various signals including the transmission thereof.

Another object of the present invention is to provide an improved apparatus and method for detecting the delays of signals utilizing active portions thereof in order to ensure that the delay tracker passes through the processing means.

A further object of the invention is to use recognizable tracker pulses to track a signal through processing.

An additional object of the present invention is to allow for the resynchronization of a plurality of signals at a known location even after processing.

Another object of the present invention is to provide for a method and apparatus of detecting and compensating for processing delays in a multiplicity of signals.

Further objects of the present invention is to provide for a method and apparatus usable with a wide variety of signals having differing frequency content including video signals, audio signals, microwave signals, X-ray signals, and other signals.

Other objects and a more complete understanding of the invention may be had by referring to the following description and drawings in which:

BRIEF DESCRIPTION OF THE DRAWINGS

The structure, operation, and advantages of the presently disclosed preferred embodiment of the invention will become apparent when consideration of the following description is taken in conjunction with accompanying drawings wherein.

DESCRIPTION OF THE PREFERRED EMBODIMENTS OF THE INVENTION

Figure 1:
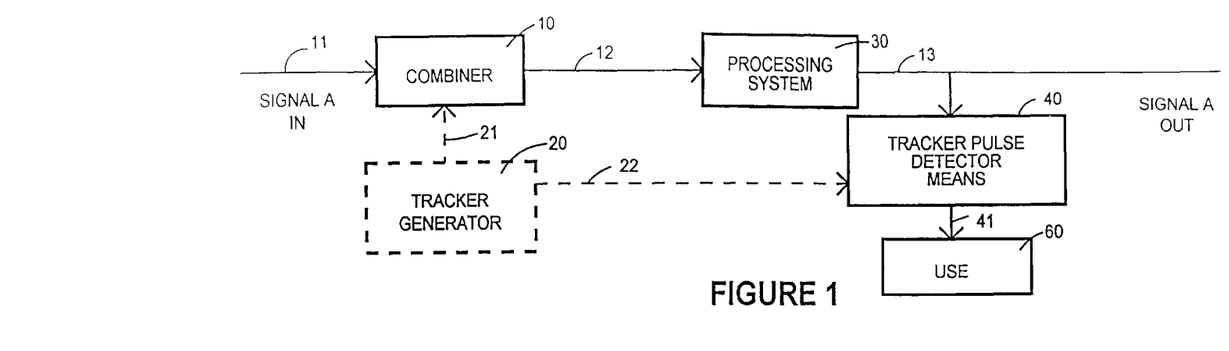
FIG. 1 is a block diagram of a basic embodiment of the invention.
Figure 2:
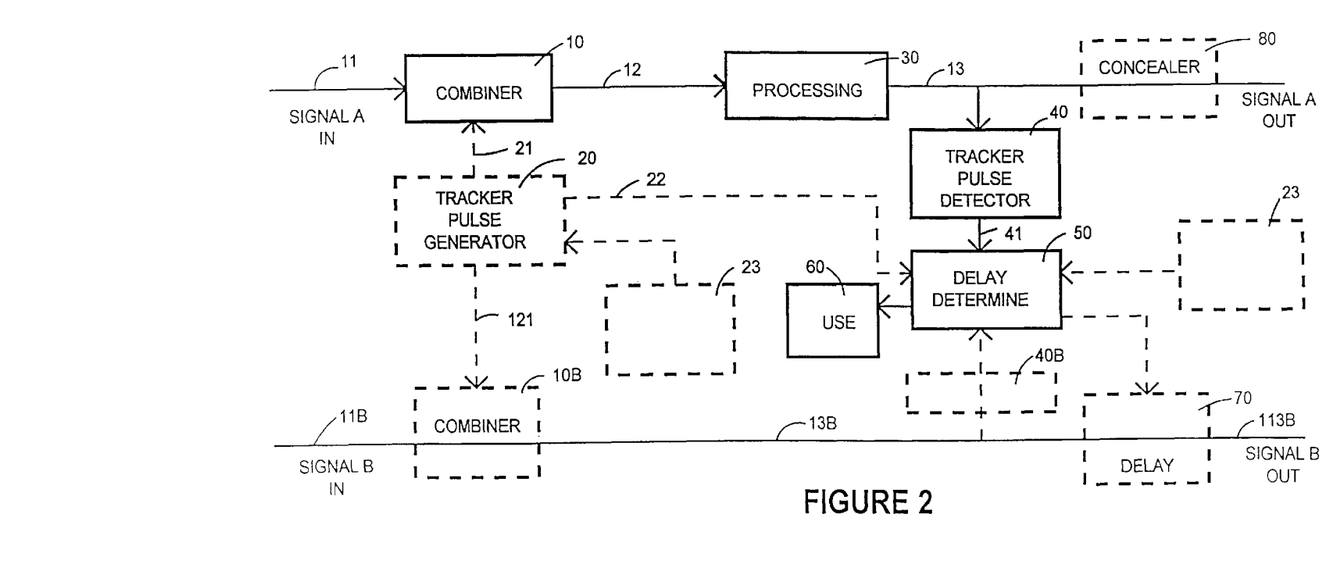
FIG. 2 is a block diagram like FIG. 1 of a two signal embodiment of the invention.

The delay tracker system includes a combiner 10, a tracker pulse generator 20, a processing means 30, a tracker pulse detector 40, a delay determination circuit 50 and a use 60 for the delay established through use of the tracker pulse (FIGS. 1 and 2).

A combiner 10 serves to associate the tracker pulse from the tracker pulse generator 20 with an input signal 11. The input signal may be any type of signal, whether amplitude, frequency, phase, digitally coded, or otherwise existent. This signal 11 includes video signals, audio signals, microwave signals, x-ray signals, digitalized signals (whether by amplitude, width, or other coding technique), and other types of signals having desired information thereon (including timing information). The signals may be single, related multiple signals, unrelated multiple signals, or any combination thereof including series and parallel forms. Further, this signal can be acquired for use and used with the invention at any point during its creation, subsequent processing, or usage including separate intermediate stages thereof. For clarity, the signal 11 will be discussed primarily as a video signal. It is to be understood, however, that this terminology includes ant type of signal which contains information about which it is at some time in the signals life appropriate to measure or determine a delay.

The tracker pulse generator 20 is designated to develop a tracker pulse for the system. While called a pulse for clarity, it may actually be any type of signal, for example code, frequency, burst or alteration of the signal 11, as will be described in more detail below. Further, the tracker pulse could be a coding or artifact placed on the signal by already existent equipment, again as will be described in more detail below. This tracker pulse is generated in recognition with the type of signal together with the processing which will or is expected to occur thereon. For example, with a NTSC video transmission system, the tracker pulse could be an amplitude modulated pulse engrafted onto the luminous portion of the signal. With a digital system, the tracker pulse may be one or more extra bit(s) or byte(s) engrafted onto the string of digital coding as appropriate for the type of coding. It is preferred that the tracker pulse be invisible or imperceptible to the ultimate use to which the signal will eventually be applied. As later described, this can be provided through subsequent processing as well as careful design. Note that while an added pulse 21 from the generator 20 is preferred, certain parameters, characteristics or ancillary signals (herein called artifacts) already present in known signals could be utilized as tracker pulses 21. For example, with video signals having a time code expressed thereon, this code could be utilized as the tracker pulse. To utilize the certain artifacts present in the input signal 11, the artifacts would be recognized and isolated at the location of the combiner 10, with the recognized artifacts then being passed to the pulse detector in order that the pulse detector measure the distance in time between the arrival of the artifacts—in specific, that passing through the processing means 30 from that which is otherwise being passed to the pulse detector. This can be directly (line 22 in FIGS. 1 and 2) or indirectly (as signal 121 on signal 11b in FIG. 2). Further note that a known clocking circuit can also be utilized to provide coding for the tracker pulse 21, thus eliminating the need for two tracker pulse paths to the delay determination circuit. For example, if The National Bureau of Standards time signal was utilized for coding, it would only be necessary for the signal(s) being tracked to carry the tracker pulse: the N.B.S. time signal could be separately and directly acquired at the delay determination circuit later described (as via box 23 in FIG. 2). This would preferably be utilized for non-archival delay tracking of individual signals. (If multiple signals were being processed, the delay determination circuit could subtract one count and/or time code from another count and/or time code to process same, thus effectively ignoring any common delays—even if measured in years). A specialized system wide coding or timing source would have the same result for such a system, albeit not as universal.

The delay tracker system is designed to be used with a processing means 30 which preferably has a known maximum delay. The reason this is important is that it is preferred that the tracker pulse be generated at a rate compatible with the maximum delay in the system. If greater accuracy is desired, the tracker pulse generator 20 would produce or use a multiplicity of distinct tracker pulses at a faster rate. Since the multiplicity of pulses are distinct in coding, location, or other ascertainable attribute, they can be separately tracked, thus significantly reducing the apparent effective time between tracker pulses. This would allow a single signal to be tracked with a great precision. This would also allow for multiple signals to be separately tracked through a single system. It would also allow a signal with unknown delay to be tracked by using the next recognizable tracker code at the pulse detector before resetting. Note that the tracker pulse generator 20 can be separate for each signal which is passed through the system (FIG. 1), or a single tracker pulse generator 20 can be utilized for a number of differing signals.

The combiner 10 associates the tracker pulse 21 with the incoming signal 11. While this pulse 21 could be at any location in the incoming signal 61, it is preferred that this combiner 10 place the tracker pulse 21 at a location where it is unobtrusive, invisible or imperceptible. This can be passive (for example, placing a video tracker pulse into the overscan area of a NTSC television signal) or active (using an otherwise visible single point on an image, preferably displaced from the central area, perhaps with a subsequent drop out compensator or averaging mechanism to effectively remove the artifacts from the pulse at a downstream location).

Note that individual types of delay tracker combiners can be designed for each type of signal which is being used, for example analog or digital (as appropriate) versions of NTSC, PAL, component, composite, compressed, serial, parallel, time sequential, etc. since in many systems multiple forms of signals are used and transcoded from one form to another.

The combiner 10 associates the tracker pulse(s) 21 at a known location or position in the signal 11. As this point can be accurately determined for use later in the processing system the pulse 21 can be subsequently detected. Note that it is preferred that the combiner 10 add the tracker pulse 21 in an active portion of the incoming video signal. This would allow the Vertical and horizontal intervals to be utilized for other functions and/or allow transcoding and other modifications to the nature of the signal. Again, if the tracker pulse was an artifact, time, frame count or other attribute already present on the signal, this information would be developed by the user for recognition by the combiner 10, with this information being passed to the remaining circuits (for example by line 22 in FIG. 1 or 121 in FIG. 2) as appropriate for use as a recognizable tracker pulse.

In the delay tracker system it is desired to add the delay tracker signal at some invisible or unobtrusive part of the video signal or data stream carrying the image. Vertical blanking or other non-image area may be used. However in some systems vertical blanking or various non-image data is stripped off which would cause the delay tracker signal therein to be lost. In these systems, the delay tracker signal would preferably be placed in the active image area of the video signal, for example in one of the extreme corners. Since virtually all television receivers are overscanned, the added delay tracker would not be visible to the home viewer. Furthermore, if the delay tracker signal is placed in the active video area, then as the video signal is converted from one form or format to another, for example from PAL to NTSC and vice versa, the delay tracker signal will be preserved as part of the image.

If multiple tracker pulses were to be utilized with a single input signal, it is preferred that the tracker pulses 21 be located at distinct locations on such signal or have such distinct attributes that they can be accurately, separately recognized by the later described pulse detection circuit. For example, if one were to track four analog audio signals with a single video signal, the tracker pulses could be put in a) the four various quadrants of the video signal, b) one in the active picture, one in the overscan, one in the horizontal sync period and one in the chrominance, or c) otherwise as desired to track the four analog signals in respect to the video signal. Note, in this respect, that since there is relatively little delay in the audio signals, it would also be possible to use a single tracker pulse for all four audio signals. As an additional example, if a time code on a video signal was to be used as an tracker pulse, differing time codes could be used as the tracker pulses for the four audio signals respectively—thus allowing the delay of the video signal to be separately compensated for in respect to each of the four audio signals.

The signal 12 output from the combiner 10 is subject to subsequent processing 30, which processing may occasion a delay to the signal. As previously set forth, it is preferred that the expected maximum of this delay be known in order to allow for the pulse generator 20 to insert tracker pulses 21 at a rate slower than the maximum delay in the system. Note, however, that if the maximum delay is difficult or not able to be accurately ascertained, the system could utilize a multiplicity of ever more widely separated recognizable, distinct tracker pulses, at least one of which has a delay longer than the practical theoretical delay for any type of processing system. The later described pulse detector 40 would, once the delay had been determined, preferably reset (i.e. ignore the trailing pulses 21 of the same multiplicity or begin processing anew with that pulse). These distinct tracker pulses 21 can also be used in aggregate to more closely track the delay in the system, by using differing distinct tracker pulses to measure the delay within the maximum delay in the system or by using again a multiplicity of tracker pulses like a venier to ascertain delay. Further, in certain systems, the tracker pulse 21 might have to be refreshed at an intermediate point. For example in a digitally encoded audio signal subject to error correction, there is a theoretical limit that the pulses cannot vary by more than one half of the clock rate. The reason for this is that, under this circumstance, an error correction circuitry could wipe out the signal. With this knowledge, it would be possible to incorporate an intermediate pulse detector system with the error correction circuitry in order to ensure that a fresh tracker pulse is always present on an audio signal.

The processing system 30 typically adds a delay to one or more signals in the system, delays that can differ between signals. This processing system 30 can be transmission, record/playback, store/reproduce, transcoding, synchronization, noise reduction or any other sort of action which is taken on the signal 12. Some of these events might occur relatively simultaneously (multiple sound rooms for a single live radio broadcast)—while some might occur over a significant period of time (the archival presentation of video tapes with voice over audio). However, as long as the tracker pulse 21 is located on the signal 12, the amount of delay will be able to Accurately determined no matter what the processing.

Subsequent to processing, the now delayed signal 13 is present in the system. This signal 13 may be present after all final processing, or may be intermediate to a series of processing steps.

The signal 13 is interconnected to a pulse detector 40, which pulse detector 40 serves to recognize the tracker pulse 21 which is on the delayed signal 13. The pulse detector 40 is designed to recognize the particular type of tracker pulse 21 which is present on such signal 13. In the case of multiple tracker pulses, the pulse detector 40 would either recognize its own pertinent tracker pulse 21 while ignoring other tracker pulses that may be present on the signal or, in the case of multiple tracker pulses for a single signal, would react to the multiple tracker pulses even if these tracker pulses 21 are distinct as previously set forth. Note that if certain artifacts or characteristics already present in the signal are used as an tracker pulse, additional processing could be necessary to interpret such artifacts for recognition. For example, to convert a known frame number of a film to a specific time.

Once thetracker pulse has been detected, the detector output 41 is used (FIG. 1). This use could be modifying the main signal containing the tracker pulse in some manner (such as repeating or dropping video frames or altering the relative processing delay to compensate for the delay), by modifying another signal (such as delay an audio track to synchronize it with a video track) or otherwise as desired.

In the preferred embodiment shown, the detector output 41 is passed to a delay determination circuit 50 (FIG. 2). Also input into the delay determination circuit 50 is a further signal having a relationship to the tracker pulse 21, which further signal has something with a previously predetermined and thus ascertainable known relationship with the signal 11 which was subject to processing. If the tracker pulse 21 is coded with certain specific information—for example, the specific point of a specific line of a television screen or a SMPTE time code—it is only necessary that the further signal contain the something reflecting the same relative information. Since the further signal would arrive at the delay determination circuit 50 prior to the tracker pulse output signal 13 (the reason being the slower than the maximum delay) the delay determination circuit 50 can then compare the timing of the output signal 13 to the further signal in order to ascertain relative delay caused by the processing system 30.

This signal may take many forms. Examples include the direct passage of an tracker pulse to the delay determination circuit 50, the passage of an tracker pulse on a second signal, the acquisition of tracker pulse information from a second source, or otherwise.

In respect to the direct passage of an tracker pulse, this would occasion an interconnection between the pulse generator to the delay determination circuit 50 (line 22 in FIG. 2). This would, for example, be appropriate for tracking a single signal through processing, with or without subsequent manipulation of such signal.

In respect to the passage of an tracker pulse on a second signal if desired, in addition or instead of tracker pulse coding, the tracker pulse generator 20 could send a secondary tracker pulse 121 to a secondary combiner 10b on the secondary signal 11b (FIG. 2). Under these circumstances, the delay determination circuit 50 would compare coded tracker pulses from two detectors 40, 40b in order to ascertain the relative delay between the signals 13 and 13b. This would, for example, be appropriate for delaying the faster signal (13b in FIG. 2) by a delay in order to synchronize the two signals 13, 13b.

Note that when two signals are known to be tracked for a significant length of time, encoding the tracker pulse 21 with its data on the associated second signal would provide for a higher degree of accuracy than merely passing the tracker pulse 21 directly to the delay determination circuit. The reason for this is that the associated signal could itself be subjected to some minor processing delays, processing delays which would not be present if the tracker pulse was passed directly to the delay determination circuit. An example of this would be the audio of a television circuit being run through its own noise reduction processing circuit prior to being reassociated with the processed video signal.

In respect to acquisition of an tracker pulse from a secondary source, this would result from the use of an tracker pulse coding based on a large scale technique. Examples would include the U.S. Government N.B.S. time clock (a recognized standard worldwide) or a systems own main clock. Under these circumstances, this information could be taken separately, directly from the secondary source 23 for both the tracker pulse and the delay determination circuit 50 (shown FIG. 2). By using such a coding system, it is not necessary to pass the tracker pulse directly (line 22), or indirectly (line 121) past the processing system 30—the information is separately acquirable. This would, for example, be appropriate for measuring delays over vast processing networks or within a particular networks own distribution system.

In certain instances, the determination of the delay could be an end in itself. For example, the delay can be used as a measure of quality or efficiency of processing 30. More typically however, the amount of delay once developed is utilized in some sort of use 60. This could include providing a readout of the relative delay, resynchronizing the signals by delaying a secondary signal 11B, further processing a delayed signal 13 or another third signal, or otherwise as appropriate. A typical use 60 for the invention would be to provide a delay 70 in a signal path, preferably a faster secondary signal 13b path, such that the delay determination circuit 50 controls the delay 70 (shown in dotted lines in FIG. 2) in order to provide a known relationship between the two signals 13 and 113b at this particular point in the system. A good method of resynchronizing signals is set forth in my co-pending Application 08/486,000 Improved Program Viewing Apparatus, the contents of which are included by reference.

If the tracker pulse 21 was present on the delayed signal 13 in a form which would be perceived and/or compromise the ultimate use of the signal 13, an optional concealer circuit 80 could be utilized intermediate the pulse detector 40 and the output signal 113A. This concealer 80 would remove or otherwise reduce the negative effects of tracker pulse 21. An example would be with an error control circuit.

This circuit replaces the delay tracker signal with a video signal which is taken from the preceding line of video or other suitable video as is well known. This replacement may be performed with a standard Dropout Compensator (DOC). The DOC receives a signal indicating the position and occurrence of the delay tracker signal from the delay tracker detector to cause the concealment of the delay tracker signal. It could also include means to conceal the tracker pulse—for example, by modifying or averaging the pulse 21 with other surrounding signals to reduce its obtrusiveness. A dropout compensator would accomplish this purpose in a video circuit application.

Figure 4:
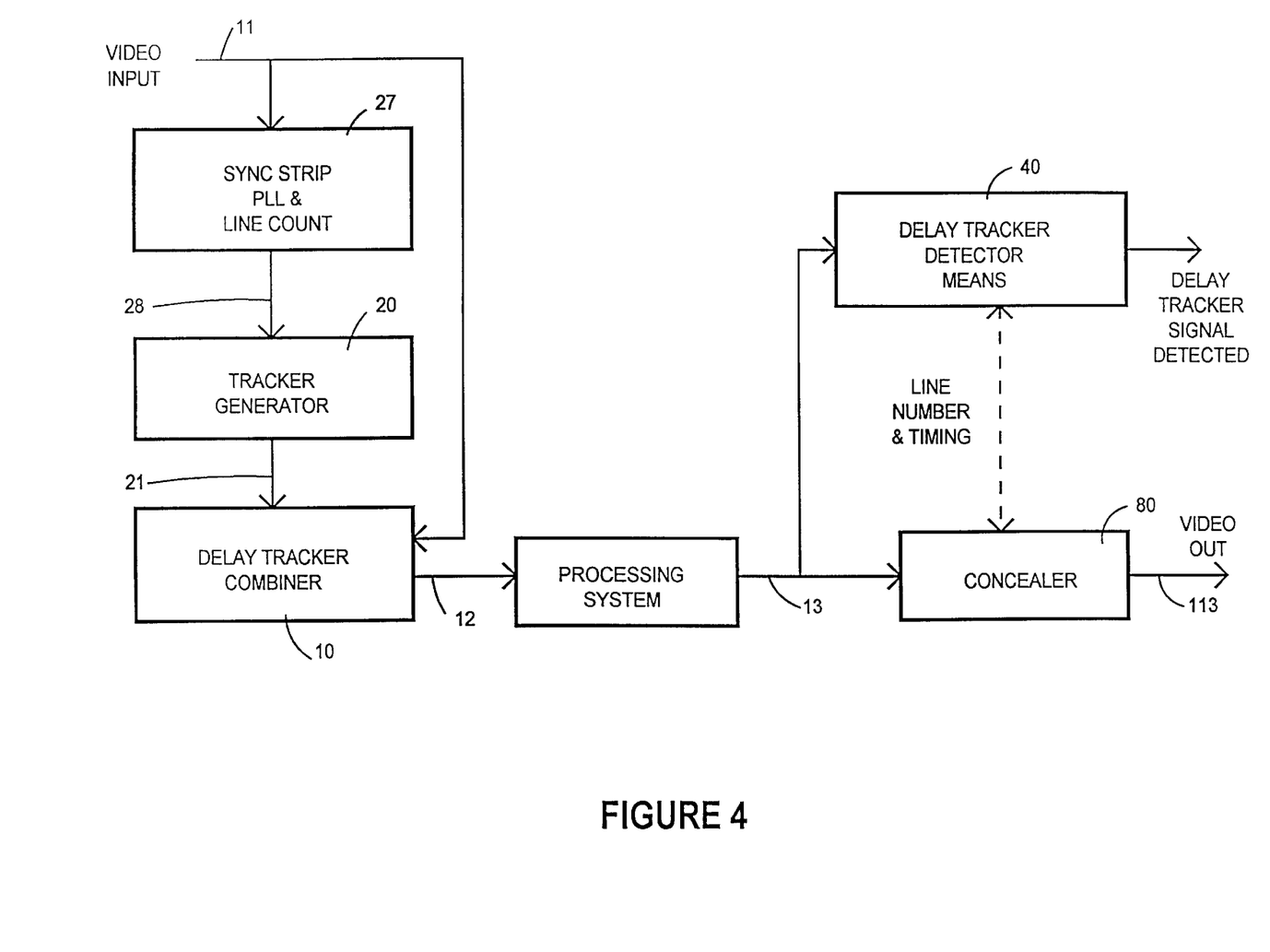
FIG. 4 is a block diagram of a video processing system including the invention.
Figure 5:
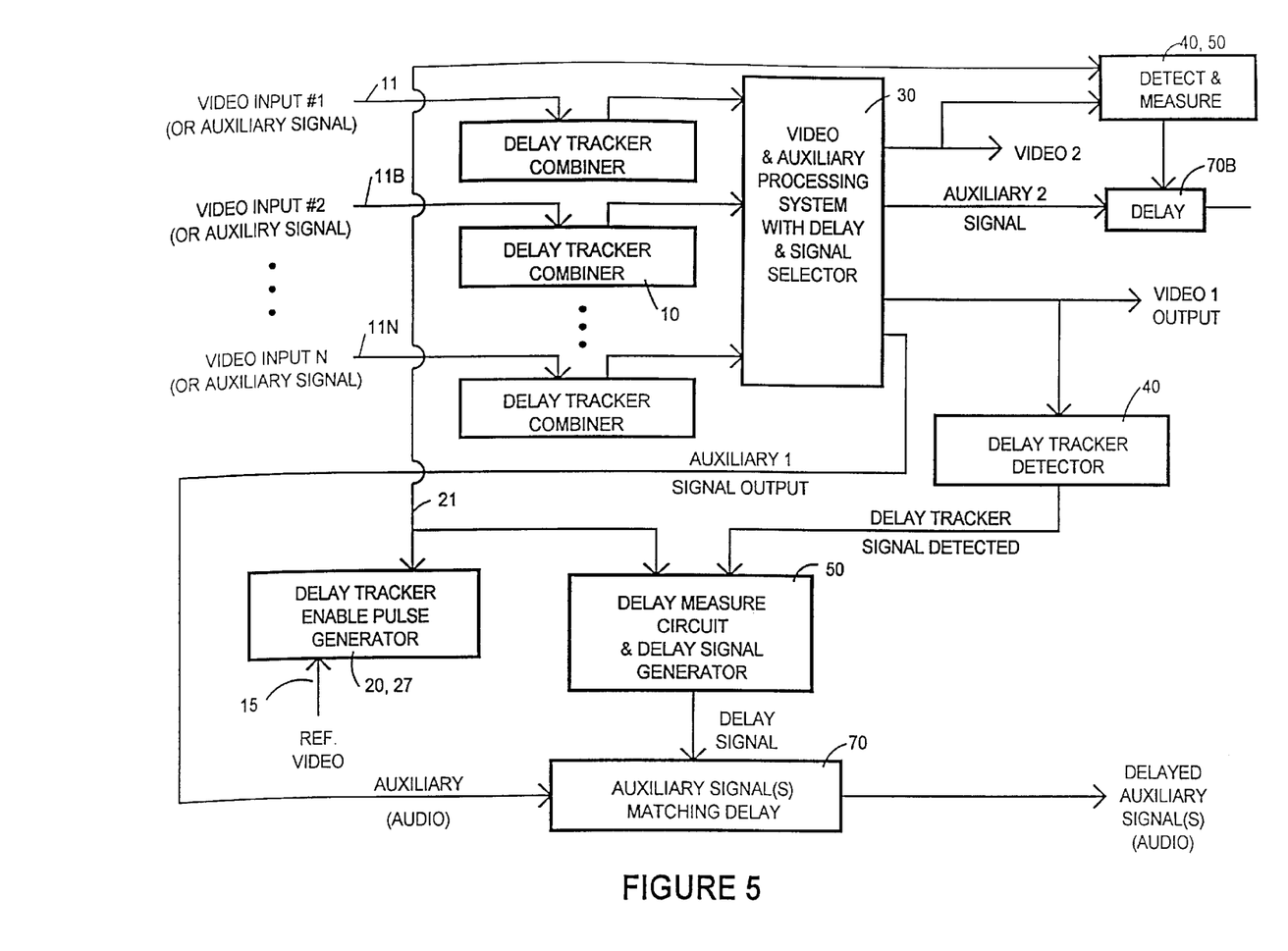
FIG. 5 is a block diagram of a multiple input delay tracking system.

There are many modifications and permutations which can be made to the invention of this application without turning from its teachings. Examples are shown in FIGS. 3, 4, and 5.

Figure 3:
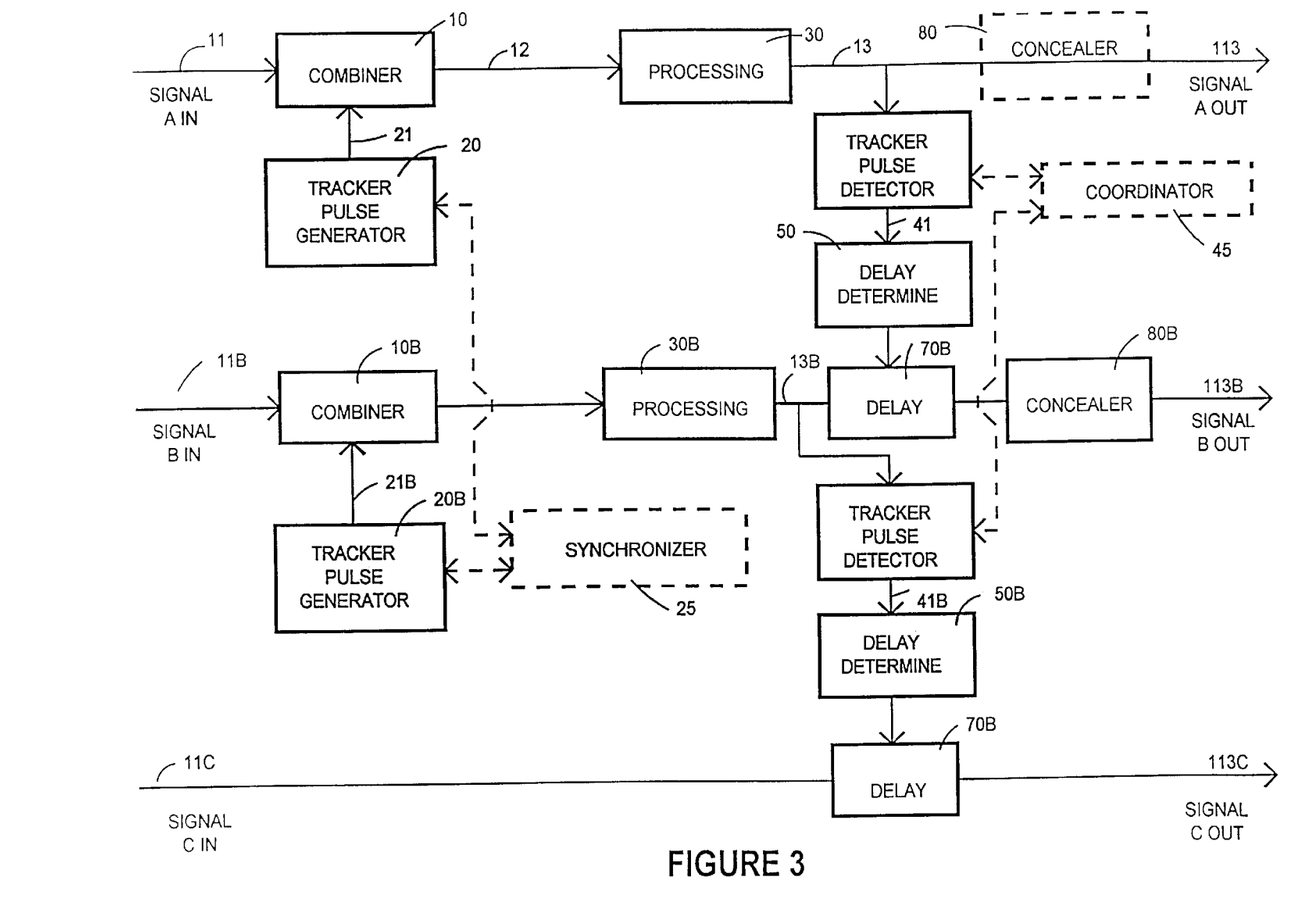
FIG. 3 is a block diagram like FIG. 1 of a modified embodiment of the invention.

In FIG. 3, there are two signals 11 and 11b which are being separately tracked through a processing means 30, 30b. This processing means can be a single related processing means for both signals, optionally, the second signal 11b could pass through a separate processing means 30b (as shown). Both signals shown have their own unique tracker pulse generators 20, 20b. If desired, a synchronizer 25 could be added to corelate the tracker pulses 21, 21b in a predictable manner. This could include full synchronization (although in this situation, it might be simpler to use a single tracker pulse generator for both signals), it could be with a known relationship between the two pulses 21 and 21a (for example, to compensate for the repetitive nature of the signals and/or the differing delays to be expected in the processing means 30, 30*b*), or otherwise. The use of the separate tracker pulse generators 21, 21*b* is preferred in that it allows each signal 11, 11*b* to be individually tracked (i.e. recognized by their respective pulse detectors 40, 40*b*).

The two tracker pulses 21, 21*b* are detected by their respective pulse detectors 40, 40*b* in order to determine the appropriate delays between the tracked signals. This is the relationship between signal 13 and 13*b*, the relationship between signal 13*b* and signal 11*c*, and (indirectly) the relationship between signal 13 and signal 11*c*. By varying the interconnections of the various delay determination circuits, other variations are also possible.

Once the delay is determined, it is again utilized. In FIG. 3 it is used to synchronize the signals 113 and 113*b* and to synchronize the signal 113*b* and 113*c*.

An optional coordinator 45 keeps track of the respective tracker pulses 21, 21*b*. This would allow the operator to keep track of the actual signals which are passing through the pulse detectors 40, 40*b*, thus providing the operator with information which would be otherwise not readily available. They would also allow an operator to synchronize signals 113 to 113*b* and, in addition, to signal 113*c*. Other types of multi signal synchronization and compensation could also be occasioned by this system.

FIG. 4 reflects a further implementation of the invention. A tracker pulse generator creates the tracker pulse 21. The particular tracker pulse 21 is generated in response to a video signal 11, for example every 10 frames. Further, by using an additional circuit (a line counter 27 shown) the tracker pulse can be combined with the line number and timing information 28 of the video input 11. This allows the tracker pulse 21 to be specifically coded with this pertinent information, thus creating a distinct and recognizable pulse, a delay tracker. The particular tracker pulse 21 shown thus includes a binary count which is incremented at the H rate of the reference signal. Thus there is a unique binary number for every line of video, and a unique number corresponding to the time when the signal is added to video. The combiner 10 encodes the current delay tracker in the video frame during which the tracker pulse 21 was received as previously set forth.

After the tracker pulse 21 is combined with the input signal 11 it is passed through the processing means 30 in the customary manner. Subsequently, the delay tracker detector 40 ascertains the delay occasioned by the processing and, in addition, replicates the line number corresponding to the location of the delay tracker signal(s). This information is then used as appropriate to ascertain the delays in the system. In addition, the concealer circuit 80 removes or otherwise reduces negative effects the delay tracker signal so as to provide for an uncorrupted video output.

In FIG. 5, a system amplifying the device of FIG. 4 is shown for one video channel (parts of this system are duplicated for each channel). In this device again a sync stripper and line counter keep track of which line of the video signal is currently present for use on the tracker pulse 21 (ref video 15 in). The particular preferred embodiment counts at the horizontal sync rate to develop a specific count for the tracker pulse 21. The actual count would vary with the anticipated maximum delay of the processing 30. For a typical NTSC system having a horizontal characteristic of 525 lines per frame, 2625 counts would allow a 10 field delay (or 12 bits of binary information on the tracker pulse 21). (Note this reference video can be, but does not have to be, one of the signals being processed). When the proper video location is present, the combiner 10 encodes the then current count in the input signal(s) at the appropriate position, for example in the active video, overscan, the vertical blanking or otherwise as desired.

To allow for processing of the tracker pulse 21, it is appropriate to have a capacity to count greater than actually expected to allow for tolerances and operational speeds of the system. Note also that if an incompatible video or other auxiliary signal incorporated the tracker pulse appropriate coding suitable for the signal may be required. For example, if an analog audio signal would carry the tracker pulse 21, an intermittent high frequency carrier of 22 khz could be utilized to carry the same example 12 bits of information with suitable accuracy.

The tracker pulse signal 21 shown in FIG. 5 is as set forth a binary number which is clocked by a reference video H. In this system with multiple asynchronous video signals, the count is locked to a reference (in this case a reference video signal 15), and the same binary count is applied to all the delay tracker combiners 10. When the count is subsequently recovered from the delayed video by the detectors 40, it is subtracted from the current count by a delay determination circuit 50 including a difference calculator to give the number of video lines of delay which the video signal has experienced in the system. The lines of delay ascertained by this determinator 50 are converted to milliseconds, seconds or other suitable delay measure and a delay signal is output to drive a matching delay 101 in an auxiliary signal path, a delay such as the Pixel Instruments AD3100. Again, audio or other auxiliary signals could also be used with the system.

It is preferred that all of the video signals carry the encoded delay tracker signal through the video processing system so that, no matter which signal is selected as the output, there will be a delay tracker on it allowing the delay to be measured. In the event a signal without a delay tracker is output, the difference calculator can be preset to output a default delay value, which may be preset or operator adjustable.

This system has some real advantages. First, it is cheap to implement for multiple video signals. The delay tracker combiner cost is divided by $250 per video channel. The delay detector and calculator is around $4,500. Of course, only one delay detector is needed per system although more can be used for corrections at intermediate points.

Although the invention has been described in its preferred form with a certain degree of particularity, it is to be understood that numerous changes can be made without departing from the invention as hereinafter claimed.

What is claimed is:

1. In a signal processing system having a signal having desired substantive information thereon passing through a delay, which delay may change, the improvement of a delay tracker, said delay tracker comprising a tracker pulse, means to associate said tracker pulse with the signal having desired substantive information thereon, a pulse detector means, means to associate said pulse detector means with the processing system and said pulse detector means recognizing said tracker pulse to develop a determination of the delay of said tracker pulse.

2. In a signal processing system having a signal having desired substantive information thereon, the signal having desired substantive information thereon may have a changing delay due to changes in the processing system, the improvement of a delay tracker, said delay tracker comprising a recognizable tracker pulse, means to associate said recognizable tracker pulse with the signal having desired substantive information thereon, a pulse detector means, means to associate said pulse detector means with the processing system and said pulse detector means recognizing said recognizable tracker pulse and further operative to develop a measure of the delay of said tracker pulse.

3. In a signal processing system having an incoming signal having desired substantive information thereon passing through a processing means having a delay, which delay may vary in respect to differing signal processing systems, the improvement of a delay tracker comprising a tracker pulse, a combiner means to associate said tracker pulse with the incoming signal having desired substantive information thereon prior to the incoming signal having desired substantive information thereon passing through the processing means, a tracker pulse detector means to recognize said tracker pulse on the signal having desired substantive information thereon coming from the processing means and to determine the delay of said tracker pulse, and use means responsive to said tracker pulse detector means.

4. The delay tracker of claim 3 characterized in that said use means includes a delay determination means determining the delay caused by the processing means.

5. The delay tracker of claim 1 characterized by means to determine the amount of delay from said recognized tracker pulse.

6. The delay tracker of claim 1 characterized by the addition of means to generate a measure of the delay in response to said recognition of said tracker pulse.

7. The delay tracker of claim 2 characterized by means to determine the amount of delay from said recognized tracker pulse.

8. The delay tracker of claim 2 characterized by the addition of means to generate a measure of the delay in response to said recognition of said tracker pulse.

9. The delay tracker of claim 3 characterized in that said use means includes a means to determine the amount of delay from said recognized tracker pulse.

10. The delay tracker of claim 1 characterized in that said use means includes means to generate a delay signal in response to said pulse detector means.

11. A method for tracking a delay in a signal processing system having a signal having desired substantive information thereon passing through a delay, which delay may change due to variations in the signal processing system, the method comprising associating a tracker pulse with the signal having desired substantive information thereon, using a pulse detector means associated with the processing system to recognize the tracker pulse to develop a determination of said delay in response to said tracker pulse.

12. A method for tracking a delay in a signal processing system having a signal having desired substantive information thereon, the signal may have a changing delay, the method comprising associating a recognizable tracker pulse with the signal having desired substantive information thereon, using a pulse detector associated with the processing system to recognize the recognizable tracker pulse to develop a determination of said changing delay responsive to said tracker pulse.

13. A method for tracking a delay in a signal processing system having an incoming signal having desired substantive information thereon passing through a processing means having a delay that may change, the method comprising using a combiner means to associate a tracker pulse with the incoming signal having desired substantive information thereon prior to the incoming signal having desired substantive information thereon passing through the processing means, recognizing the tracker pulse on the signal having desired substantive information thereon coming from the processing means, and using said tracker pulse detector means to develop a determination of the delay of said tracker pulse to track said delay that may change.

* * * * *

UNITED STATES PATENT AND TRADEMARK OFFICE
CERTIFICATE OF CORRECTION

PATENT NO. : 6,351,281 B1
DATED : February 26, 2002
INVENTOR(S) : James Carl Cooper It is certified that error appears in the above-identified patent and that said Letters Patent is hereby corrected as shown below:

Title page,
Item [56], References Cited, U.S. PATENT DOCUMENTS, insert the following:

| | | | | |
|---|---|---|---|---|
| -- 5,202,761 | Apr. 1993 | Cooper | 358 | 149 |
| 4,313,135 | Jan. 1982 | Cooper | 358 | 149 |
| 5,450,134 | Sep. 1995 | Legate | 348 | 467 |
| 5,557,334 | Sep. 1996 | Legate | 348 | 473 -- |

Signed and Sealed this

Eighth Day of March, 2005

JON W. DUDAS
*Director of the United States Patent and Trademark Office*